United States Patent [19]
Jurisch et al.

[11] Patent Number: 5,519,729
[45] Date of Patent: May 21, 1996

[54] METHOD OF AND DEVICE FOR TRANSMITTING SERIAL DATA STRUCTURES IN SYSTEMS FOR IDENTIFYING INFORMATION CARRIERS

[75] Inventors: Reinhard Jurisch; Peter Peitsch; Olaf Brodersen, all of Erfurt, Germany

[73] Assignee: Micro-Sensys GmbH, Erfurt, Germany

[21] Appl. No.: 142,353

[22] PCT Filed: Mar. 26, 1993

[86] PCT No.: PCT/EP93/00748

§ 371 Date: May 6, 1994

§ 102(e) Date: May 6, 1994

[87] PCT Pub. No.: WO93/20531

PCT Pub. Date: Oct. 14, 1993

[30] Foreign Application Priority Data

Mar. 31, 1992 [DE] Germany .................. 42 10 669.9

[51] Int. Cl.⁶ .................. H04L 1/14; H04L 27/00
[52] U.S. Cl. .................. 375/259; 375/219; 375/257; 370/32; 455/41
[58] Field of Search .................. 375/219, 221, 375/257, 259, 377; 370/32; 455/41

[56] References Cited

U.S. PATENT DOCUMENTS

| | | | |
|---|---|---|---|
| 4,713,827 | 12/1987 | Lauffer et al. | 375/219 |
| 5,081,670 | 1/1992 | Reum | 375/220 |
| 5,128,972 | 7/1992 | Horinouchi et al. | 375/377 |
| 5,258,999 | 11/1993 | Wernimont et al. | 375/220 |

*Primary Examiner*—Young T. Tse
*Attorney, Agent, or Firm*—Jordan and Hamburg

[57] ABSTRACT

A process is disclosed for transmitting serial data structures for information carrier identification systems (RF-ID systems), a transmission system working according to this process and an information carrier for contactless, electromagnetic transmission of serial data structures. The identification system has an interface (antenna) and an information carrier (transponder). The transmission process is essentially characterized in that a time-parallel data transmission and comparison between the data emitted by the interface and the data immediately sent back by the information carrier is carried out. The information data carrier has as essential components two appropriately sizeable receiving and emitting inductances and a multiplexer that is connected with a demodulator, a control logic and a nonvolatile memory.

9 Claims, 4 Drawing Sheets

1

METHOD OF AND DEVICE FOR TRANSMITTING SERIAL DATA STRUCTURES IN SYSTEMS FOR IDENTIFYING INFORMATION CARRIERS

BACKGROUND OF THE INVENTION

The invention relates to a method of transmitting serial data structures in information carrier (hereinafter "transponder") identification systems and a non-contacting electromagnetic transmission system operating in accordance with the method. Furthermore, it relates to a transponder suitable for the method and system.

Identification systems of the wireless type are known, particularly in chipcards and tool identifiers as disclosed in German Patent Specifications Nos. 3 72 18 22, 3 72 16 22, European Patent EP 79 047 and in WO 88/03594. The known identification systems use integrated chips on the transponder side and are disadvantageous because a register for comparing data dissipates energy and comparatively high energy levels are required for data transfer.

Furthermore, a comparatively low level of data security exists and, with respect to some applications, the time required for data transfer and data comparison is comparatively high.

SUMMARY OF THE INVENTION

It is an object of the present invention to provide a transponder identification system and a method for transmitting serial data structures which overcomes the disadvantages of the prior art.

Briefly stated, the present invention provides a process for transmitting serial data structures for information carrier identification systems (RF-ID systems), a transmission system working according to this process and an information carrier for contactless, electromagnetic transmission of serial data structures. The identification system has an interface (antenna) and an information carrier (transponder). The transmission process is essentially characterized in that a time-parallel data transmission and comparison between the data emitted by the interface and the data immediately sent back by the information carrier is carried out. The information data carrier has as essential components two appropriately sizeable receiving and emitting inductances and a multiplexer that is connected with a demodulator, a control logic and a non-volatile memory.

According to the invention an identification system comprises an interface module (hereinafter "interrogator") and a transponder. The interrogator realizes data communication between any suitable computer and the transponder. Advantageously, control devices such as a microcontroller, a microprocessor, and a freely programmable logic array, are employed for establishing a data coupling to a computer, for example, and also for supplying required control signals and orders, and serial data inputs and outputs for transmission to the transponder. A data output of a controller in the interrogator, having a serial data structure, is input to a digital comparator which performs bitwise clocked comparison of a detected serial data structure transmitted by the transponder and recovered by an amplitude demodulator with the controller data output. A comparison result is fed into the controller for evaluation. Clock pulses are provided by the controller for clocked operation of the comparison.

Control of the data comparison is possible via a pulse static or edgetriggered flip-flop. A clock edge for S1 is set after a time $t_v + t_a$, wherein $t_v$ is the signal delay time and $t_a$ is the signal rise time. It is also possible to provide the digital comparator on the interrogator side and/or on a side of the transponder. Hereinafter only the interface version is described.

In the interrogator, data levels High and Low are convened into two frequency levels or phase levels by a frequency shift keying or phase shift keying modulator respectively. A modulated carrier frequency signal T1 drives a resonator circuit via a power driver stage. The carrier frequency signal T1 induces, via a magnetic coupling of a coil of the resonator circuit, an alternating voltage preferably via an input resonant circuit within the transponder corresponding to the carrier frequency signal T1. The input circuit at the transponder is optionally tuned by an integrated capacitor. It is considered within the scope and spirit of the present invention to do without a complete resonator circuit and to operate instead without resonant transmission of the primary and secondary sides. Accordingly, only parasitic capacities affect resonance of the coils.

A rectifier in the transponder derives an internal operating voltage supply from the high frequency voltage of the carrier frequency signal T1. The carrier frequency signal T1 is recovered from the input resonant circuit on board the transponder and is digitized by a comparator. The clock pulse and serial data signals are recovered by a demodulator of the transponder in accordance with conventional methods for demodulation depending on the kind of modulation selected for the interrogator. The serial data signal is fed into a control logic and also passed, via a digital multiplexer, into an amplitude modulator. The amplitude modulator drives an output coil of the transponder with a subcarrier frequency signal T2 which, in turn, is keyed out and in, respectively, by the beat of a detected data signal D4.

An output signal from the output coil is fed-back from the transponder and compared in the digital comparator of the interrogator. An inductive coupling of the transponder output signal to the coil of the interrogator is followed by a selective amplification at the frequency of the subcarrier and amplitude demodulation in order to recover data for the comparison.

The data transfer between the interrogator and the transponder starts with production of a supply voltage in the transponder by the voltage induced by the carrier frequency signal T1 in the input coil. Via a power-on reset circuit, a rectified voltage filtered by a filter capacitor and regulated is evaluated and maintained for further use. The rectified voltage has a level which is adjustable via the filter capacitor and controls the transmission energy of the transponder.

The information is fed into control logic of the transponder and a status indicating signal is sent to the interrogator via the digital multiplexer and amplitude modulator of the transponder. The status signal is interpreted by the controller of the interrogator to control the power driver stage via control line to prevent a voltage overload across the input coil of the transponder. After all logic operations are set, the power-on reset circuit of the transponder places the transponder into a stand-by position. Further program operations of the transponder are presettable by a program counter and the control logic of the transponder which are connected via setting and control lines, respectively.

Preferably, in the stand-by phase the status signal D2, or, particularly when fixed code carriers are concerned, the status signal D2 is transmitted once or repeatedly, via the digital multiplexer. Following transmission of the status signal, the control logic automatically sends a fixed coded information via the digital multiplexer into the amplitude modulator of the transponder. The data of the status signal D2 is evaluated in the interface module for further program operation.

In the stand-by phase, the program counter of transponder is set at a stand-by position and is only incremented when a control word is applied by the control logic to the program counter. In this manner a synchronization of the serial data flux to the transponder is obtained.

The detected data, comprising control words, address words, and data words are decoded in the control logic of the transponder. In particular, program orders are read from the control words and stored in a static register. According to the applied order, such as READ, WRITE, or ERASE, conventional communication operations are executed via lines from and to a nonvolatile memory, such as a 2 Kbit EEPROM. When the data are READ from the nonvolatile memory, the digital multiplexer is controlled to apply the data to the amplitude modulator of the transponder. A data register, such as in the prior art, is not required for data comparison when identical data are repeatedly transmitted. When the on-line data comparison in the interrogator, as described hereinabove, yields a negative result, the carrier signal is switched off, the voltage across the filter capacitor is reduced below a presettable value, the control logic of the transponder is reset by the power-on reset circuit, and the operation starts again with the starting phase provided that the transponder is switched ON again. Alternatively, when the on-line data comparison in the interrogator yields a positive result, a confirming bit is transmitted to the transponder, which can be followed by a further data transfer; or, in the event of a negative data comparison, either no confirmation bit is transmitted or a different data sequence is transmitted so that the transfer operation is repeated until a positive data comparison results.

It is an advantage of the present invention that a power consuming data register on board the transponder is not required due to the time-parallel data transfer of sent and detected data. Hence the circuit structure of the transponder is considerably simplified, the energy consumption for data transfer is reduced, the time for data transfer is low in comparison to the prior art, and a comparatively high data safety is obtained. It is a further advantage of the entire system that one and the same transfer system is suitable for the data transponder as well as for the fixed code transponder.

In order that the invention may be more readily understood, reference is made to the accompanying drawings which illustrate diagrammatically and by way of example an embodiment thereof.

BRIEF DESCRIPTIONS OF THE DRAWINGS

DETAILED DESCRIPTION OF THE INVENTION

Figure 1:
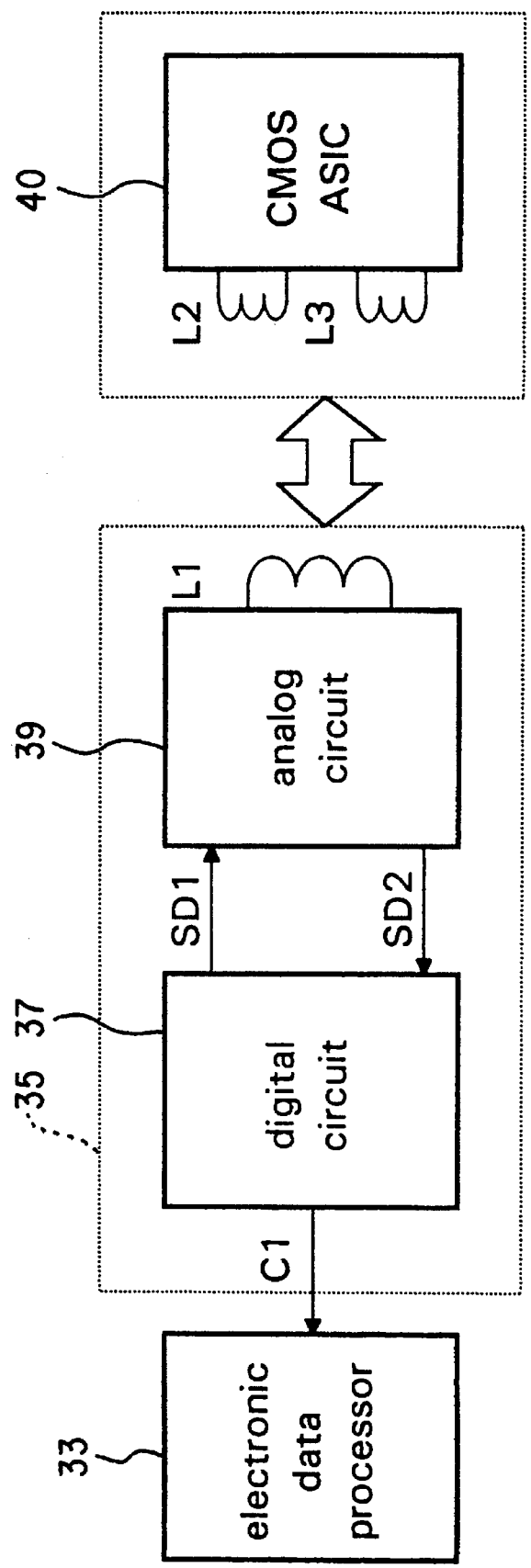
FIG. 1 shows a block scheme of the essential components of the inventional transfer system.

Referring to FIG. 1, a coupling of a general data processing unit 33 via a connection C1 to an interrogator 35 is shown. The interrogator 35 is composed of digital and analog components 37 and 39, and, is coupled by electromagnetic transmission effected by coil L1 to coil L2 and L3 of a transponder 40, preferably a CMOS-ASIC.

Figure 2:
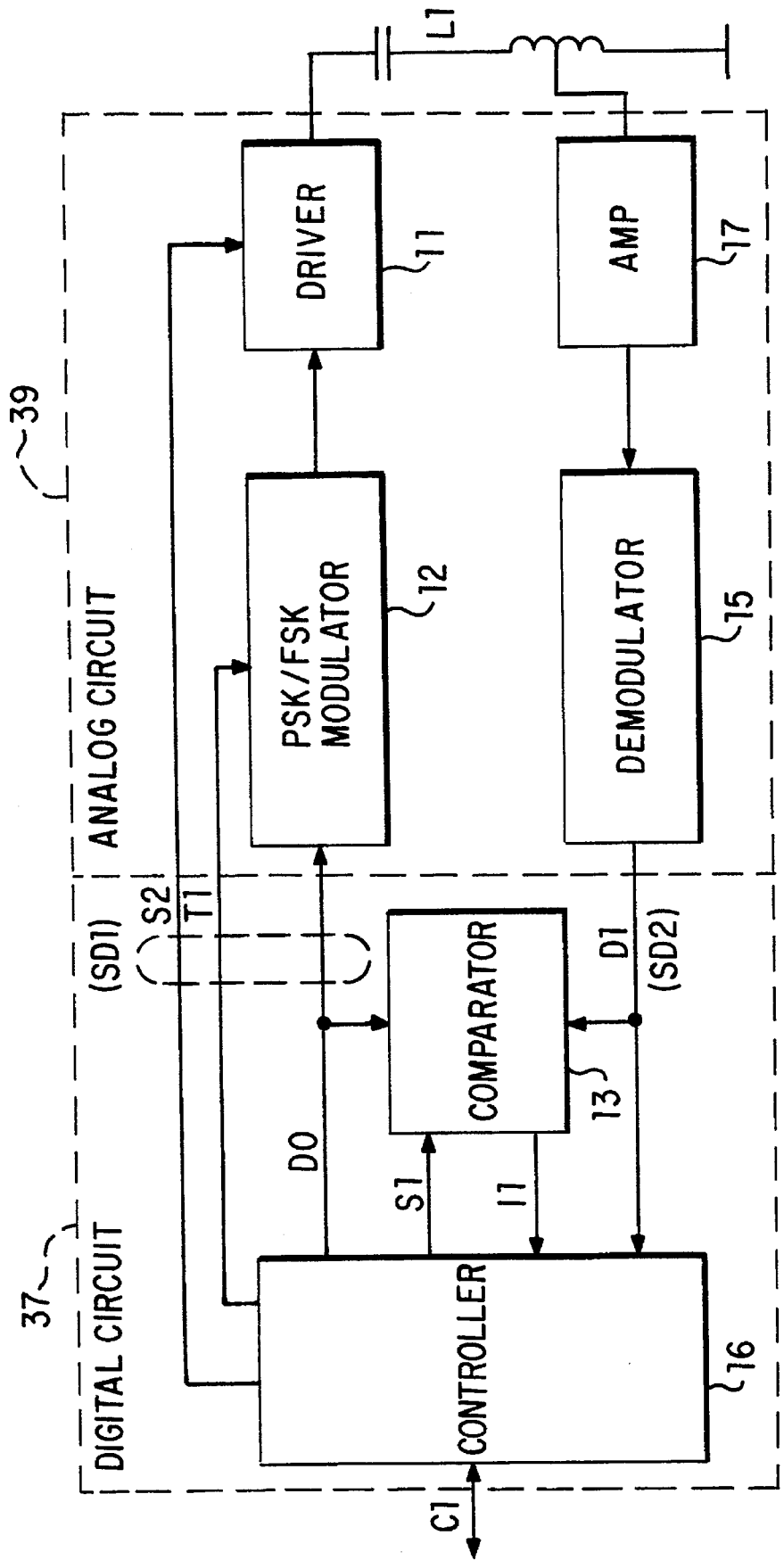
FIG. 2 shows in detail the essential components of an interface module and the interaction of the same.

Referring to FIG. 2, the interrogator 35 of the FIG. 1 is indicated by a dotted line frame. The interrogator 35 comprises a controller 16, such as a microprocessor, a microcontroller, or a programmable logic array. The interrogator 35 further comprises a digital comparator 13, a phase shift keying (PSK) or frequency shift keying (FSK) modulator 12, a demodulator 15, a power driver stage 11 and a selective amplifier 17.

Figure 3:
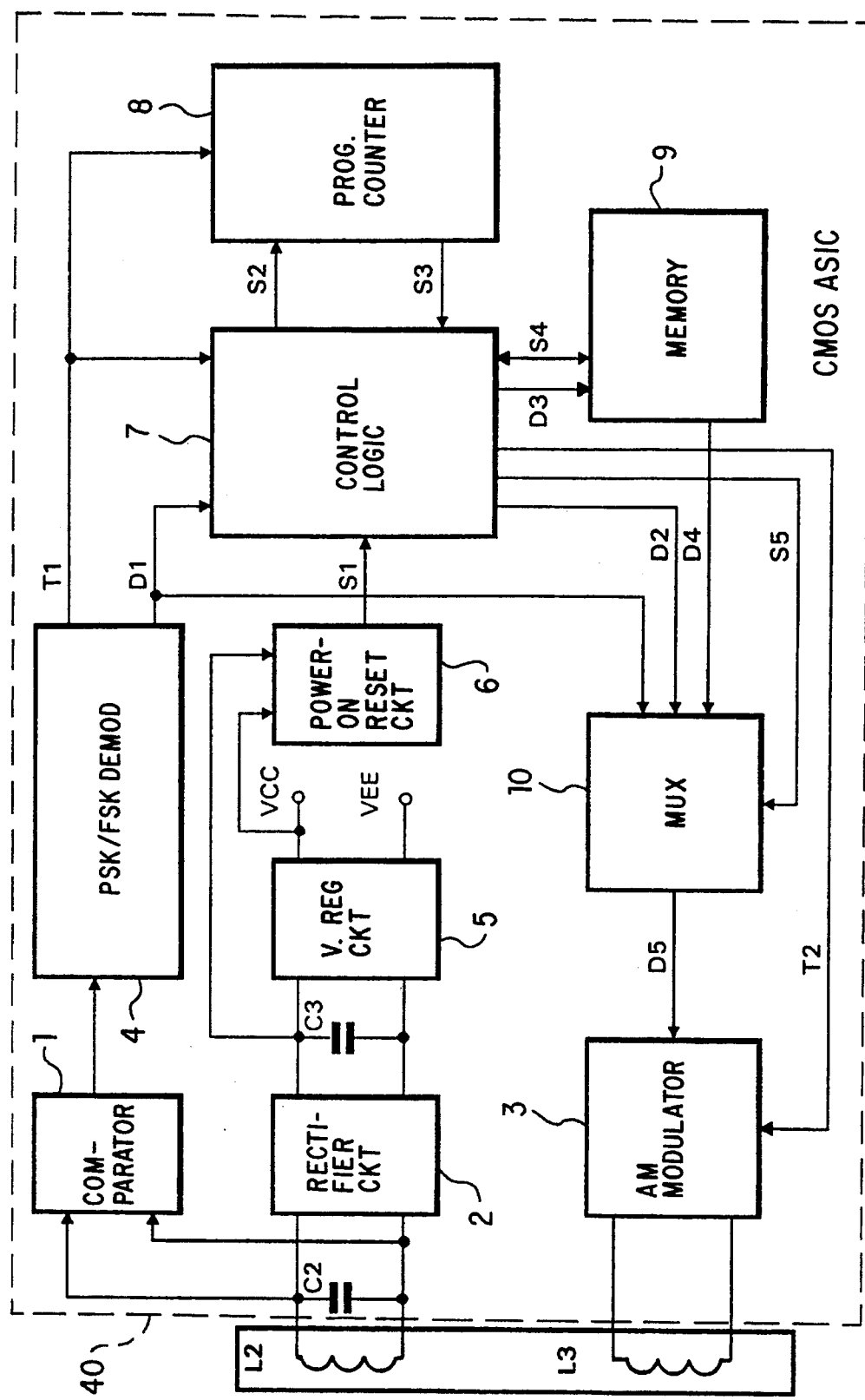
FIG. 3 shows the essential components on the transponder part and the interaction of the same.

Referring to FIG. 3, essential components of a transponder 40 include a comparator 1, a rectifier 2, a modulator 3, a phase shift or frequency shift keying (PSK/FSK) demodulator 4, a voltage regulator 5, a power-on-reset circuit 6, a control logic 7, a program counter 8, a nonvolatile memory 9, an integrated electronic switch (multiplexer) 10, and detecting (input) and sending coils L2 and L3, respectively. In addition thereto, all relevant data lines and control lines are represented at relevant paths. Hereinafter the entire operation of the system of the present invention is described.

The system operation of the present invention starts when a high-frequency carrier signal T1, at a duty cycle of 1:1, is transmitted from the interface module 35 via the coil L1 operating as an antenna. The transmission is effected by a power driver 11 amplifying the carrier frequency signal T1 modulated by a digital signal D0 in the phase keying modulator (PSK-modulator) 12 of the interrogator. The digital signal D0 represents the logic state L of a serial data signal. A control line S2 from the CPU 16 sets the power driver 11 to a peak transmission power. Alternatively, the transmission power is gradually driven to a peak within a preset period of about 1 ms. A clock-pulse signal at carrier frequency T1 provides a carrier frequency for the modulator 12 synchronized to the data signal. Via line S1, a digital comparator 13 is deactivated, so that line I1 continuously delivers a positive data comparison from the digital comparator 13, irrespective of the logic state D0 to D1 (refer to FIG. 2).

Referring again to FIG. 3, emission of the carrier frequency signal T1 and reception thereof by coil L2 produces a supply voltage at a filter capacitor C3 in the transponder 40 (data or code carrier), if the transponder 40 is within the range of transmission of coil L1, via coil L2 and rectification in the rectifier 2. When the supply voltage has arrived at a sufficiently high value, which permits the production of at least one stabilized dc-voltage VCC by operation of the voltage regulator 5, and there exists sufficient reserve energy for starting further circuit operation on board the transponder 40, the power-on-reset circuit 6 delivers a static start signal via S1 to the control logic 7. Operation functions set up to this point of time are now initiated. Particularly, a digital multiplexer 10, which represents an essential feature of the invention, is controlled by the control logic 7 via bus S5 to provide a channel D2 for serial codeword D2. The serial codeword D2 (for example, 8 bit) is cyclically fed via a line D5 into the modulator 3 and further into coil L3 (feedback antenna), by a pre-programmed routine in the control logic 7. The modulator 3 drives the coil L3 by amplitude shift keying (100% amplitude modulation) or phase shift keying modulation of a subcarrier signal T2. The coil L3 transmits the modulating information to the interrogator 35.

In the interrogator 35, the subcarrier signal T2 is received by selective coupling and rectifying. The subcarrier signal T2 contains information as phase modulation or amplitude modulation as feedback from the transponder 40. The demodulator 15 provides the respectively digitized serial codeword.

When the interrogator 35 is not able to detect a known data structure, then there is not a transponder 40 within the detection range. In this case the power source is switched OFF to save energy, and is switched ON again after a defined period of time, as described above.

When the interrogator 35 analyses a known serial data codeword, then a programmed operation starts which is determined by the contents of the code word. For example, the serial data codeword may contain a structure which is indicative of a code carrier transponder within the range of detection. In this case, the sequence of operation control of the interrogator 35 does not activate the digital comparator 13, but reads in further serial data structures. When a data length is known and received (for example, also coded in the codeword), the transponder 40 can be switched OFF. In order to check the information contents, the operation can be repeated at will. It is feasible that the codeword, for example, contains the level of the supply voltage of the transponder 40. When an adequate supply voltage is provided, the interrogator 35 reduces the transmission power via line S2.

Detection of a codeword from on board the transponder 40 can initiate a serial data transfer from the interrogator 35 to the transponder 40 with a start bit. Simultaneously, the digital comparator 13 is activated and a data comparison of bits is performed.

Figure 4:
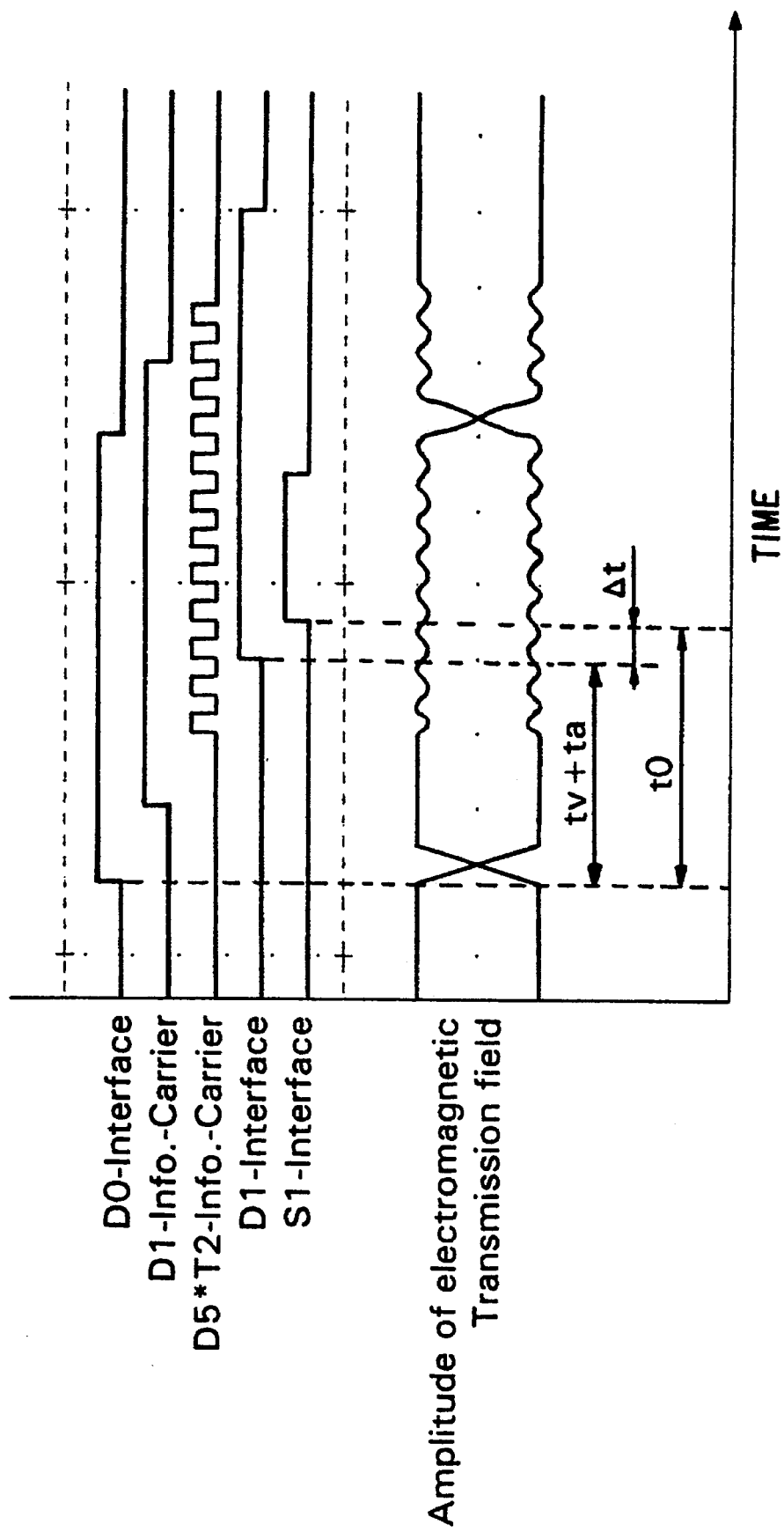
FIG. 4 is an example of the data structures on the interface module side as well as on the transponder side and their interaction.

Referring to FIG. 4, in order for a data comparison of bits to be carried out, a sum of the digitized signal delays plus rise and fall times of the transmission process must be less than one period of a bit. The comparison is controlled either via clock edge triggering of a flip-flop or statically. The clock edge control of the data comparison is made only after a period of $$t0 = t_v + t_a + \Delta t$$

via line S1. The clock pulses are fed in via the control line S1. When the bit comparison is negative, the digital comparator 13 delivers via line I1 an information signal to the controller 16. The controller 16 turns OFF the carrier frequency signal T1 by a setting of line S2 or by switching OFF clock pulses T1 generating the carrier signal. Since energy is no longer transmitted to the transponder 40, the supply voltage across capacitor C3 dissipates and falls to a level of a preset OFF-voltage of the power-on-reset circuit 6. The started sequences of the program operations are then reset. The transponder 40 then must be reset again, as described above.

In the transponder 40 a start bit triggers the start of the serial data detection. The initiation of detection involves the sychronisation of the control logic 7 and of the program counter 8 as well as switching the digital multiplexer 10 to channel line D1 to the multiplexer 10. Thus, the detected signal is directed to the modulator 3 of the transponder 40 and then fed-back to the interrogator 35.

The serial data sequence transmitted by the interrogator 35, after the start bit, contains a control byte, an address byte and, if required, a data byte. Preferably, the control byte is transmitted first, since it serves to program the program sequence control within the control logic 7 of the transponder 40.

The program sequence in the transponder 40 proceeds in accordance with the control byte and the program implemented. The programs are stored in a read only memory (ROM) of the control logic 7 and control the program counter 8, the digital multiplexer 10 and a memory 9 during the entire data transfer from the interrogator 35 to the transponder 40. For example, when data are READ, the multiplexer 10 is synchronously switched to channel line D4 by the control logic 7 and the program counter 8, to direct serial data flow from the memory 9 to the modulator 3. It is also feasible to switch the multiplexer 10 from line D1 to line D4 in response to either the program counter 8 and the control logic 7, or in response to the contents of the control byte in the date sequence. It is further possible to skip multiplexing line D4, for example, in the course of non-volatile memory 9 and to feed in a special token for the memory operation PROGRAMMING.

At the end of the serial data sequence, the multiplexer 10 switches back to channel line D1. Again, the stand-by code is continuously transmitted wherein variable status signals can be contained. It is feasible that the code word transmission contains: a transponder code, a customer specific code, a digitized operation voltage of the transponder, the operation state of the memory (for example, the WRITE operation in the EEPROM: "WRITE in progress").

The time-parallel bi-directional transmission according to the present invention requires a particular method to separate the modulated data signals of the carrier frequency signal T1 of the interrogator 35 from the fed-back data of the transponder 35. To this end, the invention provides the subcarrier signal T2, which, by use of frequency selective means, is split from the carrier frequency signal T1 in the interrogator 35. A defined minimum frequency spacing between frequencies of both signals and different kinds of modulation are therefore used. It is feasible, for example, to considerably increase the sensitivity of detection of the fed-back signal by employing an amplitude demodulator, which recovers and selectively amplifies the subcarrier in the interrogator 35, and a phase modulator which contains the phase position of the subcarrier according to the data information.

Furthermore, the three-coil arrangement offers considerable advantages for realizing the objects of the invention. The employment of a third coil, which is not provided by the state of art, requires that the input circuit and the transmission circuit on board the carrier be galvanically separated and results in a complex three-coil-system in which the coils L1, L2 and L3 are remote coupled with one another. This permits realization of presettable voltage and attenuation ratios via the three coils due to coupling factors effected by respective geometries. Geometrical arrangements are feasible which, for example, effect a comparatively low attenuation of the energy detected across input coil L2 as well as a more effective modulation of the feed-back signal across the coil L1. So, in particular, the attenuation of the voltage induced by the coil L1 across input coil L2 of the transponder is preferably less than 20%. This coupling is achieved by embodying coils L2 and L3 as planar coils where coil L3 is arranged in the interior of coil L2, coil axes of coils L2 and L3 are arranged substantially coaxially to one another and the axes of the former being in parallel to a coil axis of coil L1. A dimensioning of K12*K23<<K13 is one feasible limiting case, wherein K12 is the coupling factor between coils L1 and L2 etc.

What is claimed is:

1. A method for inductively transmitting serial data structures in transponder identification systems comprising the steps of:

(a) transmitting a first carrier signal from an interrogator including modulating said first carrier signal with data using one of frequency modulation and phase modulation to transmit said data via electromagnetic waves of said first carrier signal;

(b) detecting said first carrier signal at a transponder functioning as an information carrier;

(c) demodulating said detected first carrier signal at said transponder to recover said data transmitted by said one of frequency modulation and phase modulation;

(d) performing operations upon said data to effect one of decoding, reading and writing of said data in said transponder;

(e) modulating a second carrier signal at said transponder using said data substantially immediately following said demodulation operation at said transponder and transmitting said modulated second carrier signal to effect time-parallel feed-back to said interrogator;

(f) demodulating said modulated second carrier signal at said interrogator to recover said data;

(g) comparing bitwise said data recovered at said interrogator and said data being used to presently modulate said first carrier signal;

(h) halting said comparing in a manner of one of abruptly, at an end of a data word, and at an end of a data sequence in response to a negative data comparison result; and (i) repeating steps (a) through (h) until said data recovered at said interrogator and said data being used to presently modulate said first carrier signal are identical.

2. The method of claim 1 further comprising:

rectifying and regulating said first carrier signal at said transponder following said step of detecting to provide a supply voltage for said transponder;

said step of halting includes switching OFF the first carrier signal effecting a drop of the supply voltage at the transponder; and resetting the transponder when the first carrier signal is switched ON.

3. The method according to claim 1, wherein in response to the negative data comparison result the transponder is reset via an inherent control logic by a detected control bit, the resetting being repeated until sent and detected data are identical.

4. The method according to claim 1 further comprising:

receiving said data from a source into a controller in said interrogator;

said step of transmitting including said controller applying said data to said one of said frequency and phase modulator to modulate said first carrier signal, applying power amplification to said first carrier signal following modulation followed by applying said first carrier signal to a sender resonant circuit, at said interrogator, emitting electromagnetic waves corresponding to said first carrier signal;

said step of detecting including:
receiving said electromagnetic waves by an integrated transponder resonant circuit to recover said first carrier signal at said transponder;
rectifying a portion of said first carrier signal to produce a supply voltage of said transponder; and
digitizing said first carrier signal in a comparator effecting amplification and limiting of said first carrier signal;

said step of demodulating said detected first carrier signal including recovering one of a clock pulse modulation and a synchronization modulation by one of a frequency demodulation and a phase demodulation being carried out in a suitable subsequent circuit to recover the data transmitted by said interrogator;

triggering said step of modulating said second carrier signal in said transponder in response to a preselected sender and detector clock pulse received in said data;

said step of modulating said second carrier signal including said data recovered being passed on to a modulator which drives a transponder transmitting coil with said second carrier signal and feeds electromagnetic waves emitted by said transponder transmitting coil into said sender resonant circuit;

said step of comparing including an on-line data comparison being carried out in a comparator between said data recovered at said interrogator and said data being used to presently modulate said first carrier signal at said interrogator;

resetting the transponder in the event of non-conformity in the comparing step; and transmitting the same data repeatedly from the interrogator until conformity is obtained, then transmitting further data structures in response to obtaining conformity.

5. The method according to claim 1 further comprising:

rectifying a portion of said first carrier signal detected at said transponder to produce a supply voltage for the transponder; and controlling a level of the electromagnetic field of the first carrier signal in order maintain a proper supply voltage by transmitting said second carrier signal at a subcarrier frequency to effect control of a level of said first carrier signal applied across a sender coil of the interrogator by regulating an energy output of a power stage.

6. A transmission system for electromagnetically transmitting serial data and interfacing with a data source for transponder identification systems, comprising:

an interrogator including means for receiving, processing, and transmitting serial data from said data source;

a transponder;

said interrogator including one of a phase modulator and a frequency modulator to modulate a carrier signal with said serial data from said data source, and a first resonant circuit;

a power driver stage accepting an output form said one of the phase modulator and the frequency modulator and driving said first resonant circuit;

said first resonant circuit being connected via a tuned amplifier to a demodulator;

a digital comparator accepting a demodulated output from said demodulator;

said interrogator including a controller means for controlling operations thereof;

said controller means receiving an output from said digital comparator;

said first resonant circuit being electromagnetically coupled to a second resonant circuit of said transponder proximate said interrogator;

said transponder including an input rectifier, one of a frequency demodulator and phase demodulator corresponding to said one of said frequency modulator and phase modulator of said interrogator, respectively;

a multiplexer;

said transponder further including a third resonant circuit and a modulator selectively connected to an output of said one of the frequency demodulator and phase demodulator in a presettable clock-pulse ratio via said multiplexer and providing a signal to said third resonant circuit;

said transponder including a control logic responsive to said one of the frequency demodulator and phase demodulator, a program counter, and a nonvolatile memory; and said control logic being connected to said program counter and said nonvolatile memory and effecting control of said multiplexer to feed back said serial data received from said interrogator to said interrogator via said modulator and said third resonant circuit being electromagnetically coupled to said first resonant circuit.

7. A transponder for electromagneticly coupling with a receiving coil in an interrogator of an identification system, comprising:

an input resonant circuit including an input coil;

a comparator accepting an output of said input coil;

one of a phase demodulator and frequency demodulator coupled to receive an output of said comparator;

control logic means for controlling said transponder and a program counter interfaced with said control logic means;

a nonvolatile memory connected to said control logic means;

a modulator accepting a subcarrier signal from said control logic means for modulation thereof;

a digital multiplexer having a first channel input connected to said one of the phase demodulator and frequency demodulator to channel an output of said one of the phase demodulator and frequency demodulator;

said digital multiplexer having control inputs connected to said control logic means, a second channel input connected to said nonvolatile memory, and a channel output connected to a modulating input of said modulator for generating a modulated subcarrier signal; and a sender coil driven by said modulated subcarrier signal for generating a field in said receiving coil of said interrogator.

8. The transponder system according to claim 7, wherein:

said input coil of said input resonant circuit is configured to receive a voltage induced therein by said receiver coil of said interrogator that is within 20% of a voltage in said receiver coil of said interrogator; and the sender coil is configured in such relation to said input coil of said input resonant circuit that the voltage induced in the sender coil is attenuated sufficiently to permit driving said sender coil by said transponder in the form of an integrated circuit.

9. The transponder system according to claim 8 wherein the sender and input coils of said transponder are substantially coaxially arranged in one plane and axes of said sender and input coil are arranged to be substantially axially parallel to a coil axis of the receiver coil of said interrogator.

* * * * *